United States Patent [19]

Eldin

[11] Patent Number: 4,486,494
[45] Date of Patent: Dec. 4, 1984

[54] FIBRE COMPOSITE PREPREGS COATED WITH TWO DIFFERENT RESINS

[75] Inventor: Sameer H. Eldin, Fribourg, Switzerland

[73] Assignee: Ciba-Geigy Corporation, Ardsley, N.Y.

[21] Appl. No.: 556,745

[22] Filed: Nov. 30, 1983

[30] Foreign Application Priority Data

Dec. 8, 1982 [CH] Switzerland .......................... 7141/82

[51] Int. Cl.$^3$ ....................... B32B 27/12; B32B 27/30; B32B 27/38
[52] U.S. Cl. .................................. 428/260; 156/307.7; 264/258; 264/331.12; 428/271; 428/272; 428/273; 428/288; 428/290; 428/294; 428/408; 428/902
[58] Field of Search ........................... 264/258, 331.12; 156/307.7; 428/260, 272, 273, 271, 288, 290, 294, 902, 408

[56] References Cited

U.S. PATENT DOCUMENTS 4,206,309  6/1980  Eldin et al. .
4,256,867  3/1981  Eldin .................................. 526/263
4,386,192  5/1983  Eldin et al. .

OTHER PUBLICATIONS

R. V. Subramanian et al., Proc. 33rd Ann. Conf. Reinforced Plastics/Composites Inst., Feb. 1978, Sec. 20-F, pp. 1-8.

*Primary Examiner*—James C. Cannon
*Attorney, Agent, or Firm*—Luther A. R. Hall

[57] ABSTRACT

Fibre composite prepregs comprising:
(a) reinforcing fibres, or fabrics formed therefrom, coated with a copolymer, the copolymer consisting of maleic anhydride or a maleic acid derivative and a hydantoin vinyl ether of the formula I, with the monomers having a specific molar ratio, and
(b) a curable resin matrix.

The formula I and the meanings of the individual symbols are given in claim 1.

The fibre composite systems produced from the fibre composite prepregs by moulding and crosslinking of the resin matrix have excellent interlaminar shear strength and impact bend strength.

6 Claims, No Drawings

FIBRE COMPOSITE PREPREGS COATED WITH TWO DIFFERENT RESINS

High demands, particularly with regard to the interlaminar shear strength and impact bend strength, are made upon fibre composite materials, which have become widely used as light construction materials. It is known that the final properties of a composite formed from reinforcing fibres and a plastics matrix can be improved by means of a polymeric intermediate layer. A particularly advantageous method for applying a polymer coating to reinforcing fibres, this coating constituting in the fibre composite system the polymeric intermediate layer, is, as is known, the electrodeposition method, since this can be carried out continuously and renders possible the production of coatings of a specific film thickness with great uniformity. It has already been disclosed in SPI, Proceedings of the thirty-third Annual Conference of Reinforced Plastics/Composite Institute, Feb. 6th, 1978, that specific carboxyl-functional copolymers based on maleic anhydride and styrene, methylvinyl ether or olefins, such as hexene, decene or octadecene, are suitable for electrodeposition on carbon fibres, and can, in combination with an epoxy resin formulation, be processed into laminates having valuable mechanical properties.

It has now been found that reinforcing fibres coated with copolymers formed from hydantoin vinyl ether and a maleic acid derivative are suitable materials for producing fibre composite systems since they impart to the composite better mechanical properties, especially a better interlaminar shear strength and impact bend strength.

Subject matter of the present invention is hence fibre composite prepregs comprising:

(a) reinforcing fibres, or a fabric formed therefrom, coated with a copolymer, the copolymer consisting of maleic anhydride or a maleic acid derivative and a hydantoin vinyl ether of the formula (I)

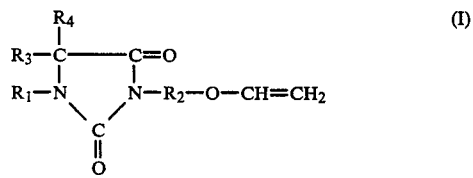

wherein $R_1$ is hydrogen or an organic radical, $R_2$ is an alkylene group having 1 to 6 C atoms or the radical $-(\text{alkylene-O})_n-\text{alkylene}$, wherein the alkylene groups contain 1 to 6 C atoms, and n is a number from 1 to 6, and $R_3$ and $R_4$ independently of one another are each hydrogen, an alkyl group having 1 to 6 C atoms, or an aryl group, or $R_3$ and $R_4$ together are the tetra- or pentamethylene group, the molar ratio of hydantoin vinyl ether to maleic anhydride or to the maleic acid derivative in the copolymer being 0.5:1 to 1:1, and (b) a curable resin matrix.

The coating preferably consists of a copolymer which has been produced by use of a hydantoin vinyl ether of the formula I wherein $R_1$ is phenyl, methyl, cyanoethyl, glycidyl, hydroxymethyl, hydroxyethyl, hydroxypropyl, acetyl or 2-hydroxy-2-phenyl-ethyl. For producing the copolymers, there are used in particular hydantoin vinyl ethers of the formula I wherein $R_1$ is hydrogen or methyl, $R_2$ is ethylene, propylene or butylene, and $R_3$ and $R_4$ independently of one another are each hydrogen, methyl, ethyl or isopropyl, or together are tetra- or pentamethylene.

Also used for producing the copolymers employed for the coating is preferably maleic anhydride, it being then possible to convert the anhydride groups contained in the copolymer, depending on the method to be used to apply the coating to the reinforcing fibres, into monosodium, monopotassium, monocalcium or monoammonium salts, amides, carboxyl groups or half-esters, the degree of esterification being able to extend from 1 to 100%, by adding to the copolymers containing the anhydride groups, for example in the benzolic suspension, anhydrous ammonia or sodium hydroxide, potassium hydroxide or calcium hydroxide.

In the copolymer used for the said coating, the molar ratio of hydantoin vinyl ether to maleic anhydride or to the maleic acid derivative is preferably 0.8:1 to 1:1, particularly 1:1. Such copolymers generally have a specific viscosity of 0.1 to 11, preferably 0.1 to 5, measured on a 1% by weight solution in dimethylformamide at 25° C.

The copolymers used for coating the reinforcing fibres are known from the German Offenlegungsschrift No. 2,829,307, wherein also the production of such copolymers derived from maleic acid derivatives is described in more detail.

A further process for producing the copolymers used for coating is disclosed in the German Offenlegungsschrift No. 3,205,396, by which process copolymers of definite specific viscosities are obtained.

The reinforcing fibres used can be those customarily employed for the fibre reinforcement of (industrial) materials. They can be organic or inorganic fibres, natural fibres or synthetic fibres, such as Aramid fibres, in the form of fibre bundles (strands) or continuous fibres. As reinforcing fibres, there are used for example: glass, asbestos, boron, carbon and metal fibres, preferably carbon, boron or metallic fibres, especially carbon fibres. Such fibres and fabrics produced therefrom are obtainable commercially.

The coating of these fibres or fabrics with the maleic acid (derivative)/hydantoin vinyl ether copolymers can be carried out, in the customary manner, by brushing or spraying with an aqueous or organic copolymer solution, or by immersion in the solution. A preferred coating method is the already mentioned electrodeposition method, since by the deposition of the polymer onto the reinforcing fibres in the electrolytic cell, more uniform coatings having the desired film thickness are obtained, with good reproducibility being obtained. The requirements for this method are of course that the employed fibres are electrically conducting and that the copolymer contains suitable groups, for example an ammonium carboxylate group and a carboxyl group. After deposition of the polymer in the electrolytic cell, the treated fibres are washed in a water bath and subsequently dried. The deposition of the polymer can be carried out batchwise or continuously. An apparatus suitable for electrodeposition is described for example in SPI, Proceedings of the thirty-third Annual Conference of Reinforced Plastics/Composites Institute, Feb. 6th, 1978.

The fibres or fabrics treated with the copolymer are then impregnated with a curable resin matrix preferably dissolved in an organic solvent, and subsequently dried. The solvent, if one has been used, is evaporated off and there are thus obtained webs or prepregs impregnated with curable resin.

Suitable as the resin matrix are essentially all curable resins or resin precursors which are in the main not volatile, and which can be applied to the pretreated reinforcing fibres and then crosslinked; and the crosslinking reaction can be a polycondensation, polyaddition or polymerisation, and can be effected thermally or catalytically and/or by light rays.

In the case of the resin matrix, it is possible to use monomers, oligomers or polymers, which can be converted in the fibre-composite prepreg into crosslinked resins.

Resins suitable for forming the matrix are for example: epoxy resins, aminoplast resins, phenol resins, unsaturated polyester resins, polyarylates, polyurethanes, and compounds containing radiation-crosslinkable groupings. Resin systems of this kind are known to the expert.

As the resin matrix, there are preferably used epoxy resins, which are cured in particular with polyamines or dicyandiamide, and the catalytically curable phenol resins, especially however the epoxy resins.

The prepregs obtained by this means can be used in a known manner for producing composite systems, that is to say, composite structural parts, for example: body parts of motor vehicles and aeroplanes, hulls of boats and ships, pressure vessels, propellers of aeroplanes, ships and hovering vehicles, rotors of helicopters, structural elements for radar aerials and space satellites, machine bearings, tools and fibre-reinforced plastics pipe lines, as well as sports articles, such as fibre poles and skis.

The present invention relates therefore also to the fibre composite systems obtained, by moulding and crosslinking of the resin matrix, from the fibre-composite prepregs according to the invention.

The composite structural parts can be produced by the manual contact method frequently used even today. There are however other possibilities for producing the structural parts, such as fabrication with the aid of a pressure or vacuum bag, and in particular the use of press moulds and platen presses. Also suitable is the so-called filament-winding process for producing the composite materials, especially for the construction of high-pressure vessels, as well as for application in the field of aviation, rocket-construction technology and astronautics.

The apparatus used for electrodeposition corresponds to that illustrated in the aforementioned SPI publication and consists of the following parts:
(A) wind-off device for the C fibres,
(B) copper guide plate,
(C) electrolytic cell,
(D) washing bath,
(E) drying zone, and
(F) wind-on device for the C fibres.

The copper guide plate B and the electrolytic cell C are connected to the positive and negative pole, respectively, of a direct-current source. The carbon fibre passes from the roll-off device A and is positively charged by the copper guide plate B. The aqueous solution of the carboxyl-functional copolymer and the cathode connected to the negative pole of the direct-current source are in the electrolytic cell C.

By keeping constant the voltage, the current and the intensity of the washing operation, there is found for various concentrations of the copolymer solutions a linear relationship between the amount of copolymer deposited (determination by incineration) and the length of time that the C fibres are in the electrolytic cell. The extent of copolymer deposition can therefore be controlled by adjustment of the wind-off speed of the C fibres. For example, with an applied voltage of 10 volts, a current of 1.6 amperes, a concentration of the aqueous solution of 2.5% by weight of copolymer and a standardised washing operation, there is required for a copolymer deposition of 2% by weight a wind-off speed of 105 cm/minute for the hydantoin vinyl ether/maleic anhydride copolymer I. The temperature in the drying zone of the apparatus is 210°–230° C.

The following copolymers and resin-matrix systems are used in the Examples.

Copolymer I 89.2 g (0.45 mol) of 3-vinyloxyethyl-5,5-dimethyl-hydantoin, 44.1 g (0.45 mol) of maleic anhydride and 3600 ml of toluene are placed into a four-necked flask well flushed with $N_2$ and provided with stirrer, thermometer, condenser and gas-inlet, and the mixture is heated under $N_2$ to 105° C. There is then added 0.67 g (0.5% by weight, relative to the monomer) of azoisobutyronitrile dissolved in a small amount of toluene, and the reaction mixture is allowed to react under $N_2$ for 5½ hours at 104° to 106° C. After cooling to room temperature, the reaction solution is filtered, and subsequently dried for 12–16 hours at 60°–70° C. in a vacuum of 20–30 mbar. The procedure is performed a total of 5 times, the copolymer being obtained in a yield of 98–99% of theory. The combined yields are homogenised in a ball mill for 4 hours. The specific viscosity of the copolymer is 0.20 (1% by weight solution in dimethylformamide at 25° C.).

The semiammonium salt is produced by suspension of the copolymer in water and neutralisation of the anhydride grouping contained in the copolymer with a commercial ammonium hydroxide solution, the copolymer then containing recurring units of the following structure:

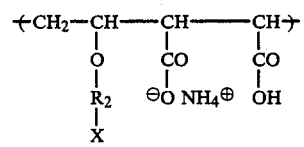

wherein X is the hydantoin group given in the formula I.

Copolymer II

A portion of the copolymer I having a specific viscosity of 0.20 and produced from 3-vinyloxyethyl-5,5-dimethyl hydantoin and maleic anhydride is dispersed, for the purpose of preparing the amide/ammonium salt, in toluene, and there is then introduced at room temperature, with vigorous stirring, an excess of anhydrous ammonia into the dispersion until a specimen is completely water-soluble. The solution is stirred for a further 15 minutes and subsequently filtered. The filter cake is washed 4 times with 50 ml of toluene each time and is afterwards dried at 50° C. in vacuo to obtain constant weight and finally ground in a ball mill. The conversion of the copolymer with ammonia to give the amide/ammonium salt is effected quantitatively. The salt has structural elements of the following formula:

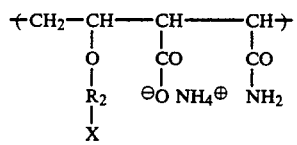

wherein X is the hydantoin group given in the formula I.

Resin matrix I 300 g of N,N,N',N'-tetraglycidyl-4,4'-diaminodiphenylmethane having an epoxide content of 8.25 val/kg are dissolved at 40°–45° C. in methyl ethyl ketone/acetone (1:1); and, after the solution has cooled to room temperature, 156 g of 4,4'-diaminodiphenylsulfone are added. After a brief stirring up of the mixture, there is obtained a clear, slightly reddish-yellow solution and, by the further addition of solvent, the impregnating solution is adjusted to the desired concentration.

It is known that the mechanical properties of unidirectional fibre-reinforced plastics are dependent on the fibre-volume proportion ($\phi$) of the reinforcing material. It is therefore customary and necessary to determine the mechanical properties as a function of the proportion of fibre volume, in order to then interpolate onto a specific $\phi$-value. The commercially usual fibre-volume proportion is about 0.5–0.7 (1.0=100 vol.% of fibre).

For the following Examples, the fibre-volume proportion in the laminate is controlled by the concentration of the impregnating solution.

EXAMPLE 1

(a) A C fibre strand (Thornel Carbon Fibre Type P, UCC) is coated with the copolymer I with the use of the apparatus for electrodeposition described in the foregoing. Starting with a 2.5% by weight aqueous copolymer I solution, there is obtained on the C fibre strand, using the standardised washing operation, a coating of 2% by weight.

(b) Preparation of the prepregs: The C fibre strand coated with the copolymer I is drawn at a rate of 10.6 m/minute through the impregnating bath containing the resin matrix I, and is subsequently wound onto a drum of 42 cm diameter around which has been wound a separating film. By careful guiding of the impregnated carbon fibre strand, there is obtained after about 25 minutes a uniform, unidirectional prepreg web about 12 cm in width. The prepreg web is predried with a UV lamp for 15 minutes so that the web can be more easily removed from the drum. After removal from the drum, the prepreg web is cut into 8 pieces each 16 cm in length. The prepreg specimens are then dried in a vacuum desiccator at 100° C. and 0.1 mbar for 1 hour. The prepregs are still slightly tacky at room temperature.

(c) Production of the laminates: The prepreg specimens are evenly arranged unidirectionally in layers on top of one another, each provided on both sides with a copper foil; a separating film is then wound round the assembly and this is subsequently moulded in an aluminium mould into the form of a laminate, the following moulding cycle being applied:

moulding cycle:
· prepregs placed at 120° C. into the press;
heated up within 20 minutes to 177° C., without pressure;
held for 90 minutes at 177° C., pressure being carefully applied after about 4 minutes—shortly before gelling—up to a final pressure of 196.14·10⁴–245.18·10⁴ Pa;
specimen heated to 205° C. and held there for 4 hours; and
then allowed to cool under pressure.

The properties of the resulting laminate with respect to interlaminar shear strength and impact bend strength are shown in the following Table.

|  | Blank test (without deposition of copolymer) | Example 1 |
| --- | --- | --- |
| copolymeric solution | none | 2.5% by weight |
| voltage/current | — | 10 V:1.6 A |
| speed of the C fibres | — | 105 cm per min$^{-1}$ |
| deposition of copolymer | — | 2% by weight |
| fibre-volume proportion ($\rho$) | 0.60 | 0.60 |
| interlaminar shear strength according to ASTM* D2344 (N/mm$^2$) | 43.9 (42.4/45.4) | 49.7 (48.6/50.8) |
| impact bend strength according to ISO** R179 (kJ/m$^2$) | 21.3 (19.9/22.7) | 33.8 (32.4/35.2) |

*ASTM = American Society for Testing and Materials
**ISO R = International Standards Organisation

EXAMPLE 2

(a) The C fibre strand used in Example 1a is coated with the copolymer II under the conditions given in Example 1a, a 2% by weight coating being obtained.

(b) Preparation of the prepregs: The C fibre strand coated with the copolymer II is treated with the impregnating solution containing the resin matrix I, the prepregs obtained being likewise slightly tacky at room temperature.

(c) Production of the laminates: The prepreg specimens are processed in a manner analogous to that in Example 1c, the resulting laminates with a fibre-volume proportion of 0.60 having the following properties:

| interlaminar shear strength: (according to ASTM 2344) | = 57.6 (55.9/59.3) N/mm$^2$ |
| --- | --- |
| impact bend strength (according to ISO R 179) | = 26.1 (25.0/27.2) kJm$^2$ |

What is claimed is:
1. A fibre composite prepreg comprising:
(a) reinforcing fibres, or a fabric formed therefrom, coated with a copolymer, the copolymer consisting of maleic anhydride or a maleic acid derivative and a hydantoin vinyl ether of the formula I

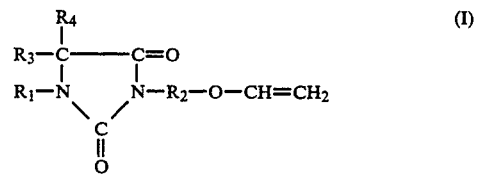

wherein R$_1$ is hydrogen or an organic radical, R$_2$ is an alkylene group having 1 to 6 C atoms or the radical $-(\text{alkylene-O})_{\overline{n}}$ alkylene, wherein the alkylene groups contain 1 to 6 C atoms, and n is a number from 1 to 6, and R$_3$ and R$_4$ independently of one another are each hydrogen, an alkyl group having 1 to 6 C atoms, or an aryl group, or $R_3$ and $R_4$ together are the tetra- or pentamethylene group, the molar ratio of hydantoin vinyl ether to maleic anhydride or to the maleic acid derivative in the copolymer being 0.5:1 to 1:1, and (b) a curable resin matrix.

2. A fibre composite prepreg according to claim 1, wherein the molar ratio of hydantoin vinyl ether to maleic anhydride or to the maleic acid derivative in the copolymer is 0.8:1 to 1:1.

3. A fibre composite prepreg according to claim 1, wherein the fibres or the fabric therefrom consist of carbon or boron fibres or of metallic fibres.

4. A fibre composite prepreg according to claim 1, wherein the fibres are carbon fibres.

5. A fibre composite prepreg according to claim 1, wherein the curable resin matrix consists of an epoxy resin and a polyamine as curing agent.

6. A fibre composite system, particularly a fibre composite laminate, produced from the fibre composite prepreg according to claim 1 by moulding and crosslinking of the resin matrix.

* * * * *